United States Patent [19]

Rogers

[11] 4,234,218
[45] Nov. 18, 1980

[54] FEEDTHROUGH DEVICE

[75] Inventor: Albert G. Rogers, Cricklade, England

[73] Assignee: Raychem Limited, London, England

[21] Appl. No.: 836,770

[22] Filed: Sep. 26, 1977

[30] Foreign Application Priority Data

Oct. 1, 1976 [GB] United Kingdom ............... 40792/76

[51] Int. Cl.² .................... H01B 17/26; H01B 17/30; F16L 5/00
[52] U.S. Cl. ................................ 285/162; 174/65 G; 174/153 G; 174/DIG. 8; 285/161; 285/381; 248/56
[58] Field of Search .......... 174/153 G, 153 R, 152 G, 174/DIG. 8, 65 G; 285/DIG. 10, 161, 162; 248/56

[56] References Cited

U.S. PATENT DOCUMENTS

| | | | |
|---|---|---|---|
| 2,668,316 | 2/1954 | Sturtevant et al. | 174/153 G X |
| 3,200,366 | 9/1965 | Stuart | 174/153 R X |
| 3,300,163 | 1/1967 | Randolph | 174/65 G X |
| 3,423,518 | 1/1969 | Weagant | 174/153 G |
| 3,548,079 | 12/1970 | Jones | 174/153 G |
| 3,891,790 | 6/1975 | Kierstead | 174/DIG. 8 |

Primary Examiner—B. A. Reynolds
Assistant Examiner—E. F. Borchelt
Attorney, Agent, or Firm—Lyon & Lyon

[57] ABSTRACT

A feedthrough device is provided for sealing a supply line as it passes through an aperture in a wall member such, for example, as the housing of electrical apparatus. The device, which is generally tubular, comprises a first member which is radially inwardly deformable and can be pushed through the aperture and a second member which can telescopically engage the first member so as to co-operate with it to clamp against the wall member and provide a seal whilst at the same time preventing radial inward deformation of the first member. A recoverable sleeve member, which may be provided on, or be integral with, either of the first or second members engages the supply line to effect a seal therewith.

20 Claims, 7 Drawing Figures

FEEDTHROUGH DEVICE

BACKGROUND TO THE INVENTION

This invention relates to feedthrough devices for supply lines, the term "supply line" as used herein covering any utility carrier, for example a cable, a wire, or a pipe, which must be passed through an aperture in a wall member, for example a bulkhead, the casing of a machine, or a housing for electrical apparatus.

When such supply lines, especially flexible supply lines, are fed through an aperture it is first of all important that there is no danger of rupture of the supply line caused by the rough edges of the aperture. It is also generally necessary that the supply line should be firmly held in relation to the aperture to avoid unwanted movement of the supply line both within the aperture and on either side of it. Finally, in many applications it is desirable to employ an airtight and watertight enclosure for housing junctions and other installations to prevent damage, corrosion or shorting of the conductors therein. One conventional practice to achieve such enclosure has been the use of an insulated stuffing box. However, stuffing boxes are cumbersome and difficult to adjust and a large number of separate components are required to produce the desired tight fit. More recently, grommets formed from heat recoverable materials have been suggested in British Pat. Nos. 1,167,587, 1,238,144 and 1,294,510. However, the grommets of those patents suffer from the disadvantage that they require access to both sides of the wall member in order to effect installation thereof.

In U.S. Pat. No. 3,548,079 there is described a bulkhead feedthrough device having two members, the first of which has a heat recoverable portion and the second of which performs a wedging function. In this device, the first member is positioned such that it surrounds the conductor or other substrate and such that a portion thereof extends through an aperture in an enclosure. The first member is provided with an annular sleeve which is positioned radially adjacent to the aperture. The heat recoverable portion is then caused to recover around the substrate and the second member is inserted within the annular sleeve to force the sleeve radially outward into contact with the walls of the aperture. The construction of this device is such that installation thereof requires access to only one side of the bulkhead. The feedthrough device of U.S. Pat. No. 3,548,079 has been found to work satisfactorily in many applications, but is not suitable for use where it is required to seal against relatively high pressures.

SUMMARY OF THE INVENTION

The present invention provides a feedthrough device for sealing a supply line within an aperture in a wall member, which comprises a first tubular member comprising a portion adapted to extend through the aperture, which portion is radially deformable and is provided with a laterally extending shoulder surface, a second tubular member having a relatively non-deformable portion adapted to engage with the first tubular member to restrain the deformable portion against radially inward deformation, and an outwardly projecting flange member adapted so as, in operation, to co-operate with the shoulder surface in exerting an axial clamping action on the faces of the wall member thereby bringing the outwardly projecting flange member into sealing engagement with one of the said faces of the wall member, at least one of the tubular members being provided with a recoverable sleeve adapted to provide on recovery a seal between the device and the supply line.

The invention also provides a method for sealing a supply line within an aperture in a wall member using a feed-through device according to the invention.

The radially inwardly deformable portion of the first tubular member is preferably formed from a resilient material and preferably comprises a plurality of circumferentially spaced apart tines or segments divided by longitudinal slits. Each of said tines preferably comprises an external surface which slopes outwardly towards its base so as to facilitate insertion through the aperture and the shoulder surface is advantageously provided at the base of the tines, said shoulder leading to a non-deformable tubular portion adapted for easy initial engagement with the non-deformable portion of the second tubular member and accurate location therein. For this purpose the second tubular member may be shaped so as to provide a groove for accommodating the non-deformable tubular portion of the first member. As explained in more detail below the internal surface of the first member, including the tines, is preferably screw-threaded for engagement with the second member. The number of tines, which are preferably regularly spaced around the circumference of the first member, is advantageously from 4 to 12, preferably from 6 to 10, especially 8.

Preferably the tines are so arranged that they are progressively deformed radially inwardly by insertion of the deformable portion through the aperture, and after passage therethrough return toward their original configuration, so that the shoulder surfaces abut against the face of the wall member remote from the direction of insertion.

The relatively non-deformable portion of the second tubular member is positioned so that it forms a support for the deformable portion of the first member so as to restrain radially inward deformation thereof.

The two tubular members may be pressfitted telescopically one inside the other in which case a locating lip is preferably provided on one or the other of the tubular members to facilitate the positioning of the relatively non-deformable portion of the second tubular member within the first tubular member. Preferably, however, they are threadedly engageable, the second tubular member being provided with an external thread which engages an internal thread on the first tubular member. In a particularly preferred embodiment the second tubular member is provided with a external thread on the relatively non-deformable portion, which portion can then be inserted into the first tubular member, engaging with an internal thread on the deformable portion of the first tubular member.

The outwardly projecting flange member may be formed integrally with one or other of the tubular members, or may be provided as a separate component which, for example may be provided with an internal thread engageable with an external thread on the first tubular member. Preferably, however, the outwardly projecting flange member is formed integrally with the second tubular member. The outwardly projecting flange member is preferably provided with an undercut portion to reduce the area of contact with the wall member or the resilient annular flange to an annular peripheral region, thus increasing the sealing pressure on the wall member.

In certain embodiments of the present invention the first tubular member is provided with a resilient annular flange which, in operation, is engaged by the outwardly projecting flange member, and is urged thereby into sealing engagement with the wall member. The resilient annular flange may be coated with an adhesive on the surface which contacts the wall member.

If desired, the resilient annular flange may be replaced or supplemented by a peripheral sealing ring positioned between the outwardly projecting flange and the wall member. In operation, the outwardly projecting flange member and the shoulder surface co-operate so as to exert an axial clamping action on the faces of the wall member adjacent the aperture, compressing the sealing ring, if present, and deforming the resilient annular flange, if present, and bringing the outwardly projecting flange member into sealing engagement with the wall member. This clamping action may be obtained after the deformable portion of the first tubular member has been inserted through the aperture in the wall member, either by screwing together the two tubular members, if the outwardly projecting flange is formed integrally with the second tubular member, or by assembling the first and second tubular members and screwing the outwardly projecting flange onto the first tubular member, if the outwardly projecting flange is formed as a separate component.

In other embodiments, no resilient annular flange and/or sealing ring is present, in which case it may be preferable to provide the outwardly projecting flange member with a sealing surface comprising an annular groove therein.

The recoverable sleeve is preferably formed from a heat recoverable material, although an elastically recoverable material may also be used. The sleeve is preferably formed integrally with the first or second tubular member, though it may be provided as a separate member if desired. Any heat recoverable material may, in principle, be used in the present invention although the most suitable material will usually depend on the environment in which the seal is being made. Suitable heat recoverable materials which may be used are disclosed in U.S. Pat. No. 3,086,242 the disclosure of which is incorporated herein by reference. Examples of such suitable materials are crosslinked polyolefins, especially polyethylene, polypropylene, crosslinked polyvinylidene fluoride, crosslinked polyvinylchloride, normal (unmodified) polyvinylchloride, crosslinked or uncrosslinked chlorinated polyethylenes, neoprene, ethylene-propylene rubbers and silicone rubbers. A heat shrinkable sleeve may be coated on its internal surface with a sealant, for example, a hot-melt adhesive.

DETAILED DESCRIPTION OF THE PREFERRED EMBODIMENTS

Figure 1:
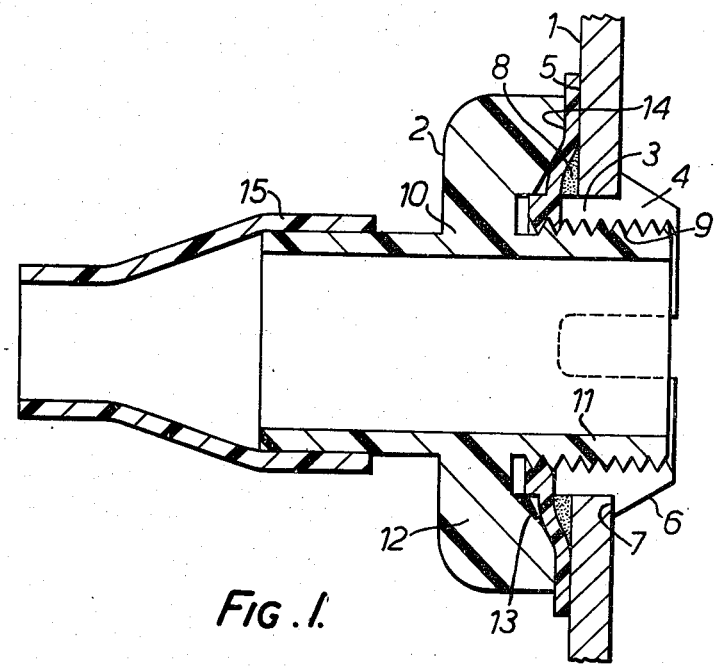
FIG. 1 illustrates in sectional side elevation one form of feedthrough device according to the invention.

Referring to FIG. 1, an apertured wall member 1 is provided with a feedthrough device illustrated generally at 2 which consists of a first tubular member 3, formed from resiliently deformable material, having radially inwardly deformable segments 4, and an annular resiliently deformable flange 5. The segments are circumferentially spaced around the first tubular member and have tapering outer surfaces 6 leading to laterally extending shoulder surfaces 7. The annular flange 5 is coated on its surface adjacent the wall member with an adhesive 8. The first tubular member is provided with an internal threaded section 9. The second tubular member 10 is provided with a relatively non-deformable threaded portion 11 which engages with the internal thread 9 on the first tubular member 3. The second tubular member is formed with an integral outwardly projecting flange 12 which co-operates with the deformable annular flange 5 so as to come into sealing engagement with the wall member 1. The outwardly projecting flange has an undercut portion 13 leaving an annular peripheral region 14 of the outwardly projecting flange 12 in contact with the deformable annular flange 5. A heat recoverable sleeve 15 fits over the end of the second tubular member remote from the non-deformable threaded portion 11.

Figure 2:
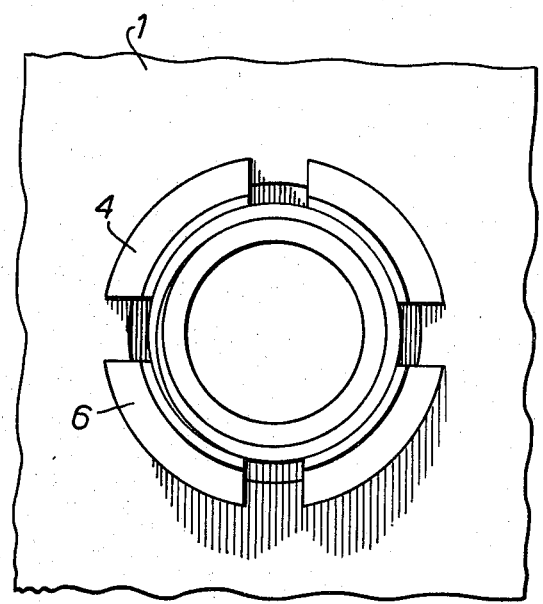
FIG. 2 illustrates the feedthrough device of FIG. 1 in end elevation.

In assembling the feedthrough device of FIGS. 1 and 2 the radially inwardly deformable segments 4 of the first tubular member 3 are pressed into the aperture. The tapering surfaces 6 contact the sides of the aperture, thus subjecting the radially inwardly deformable segments to a gradually increasing deformation until the shoulder surfaces 7 are clear of the aperture whence the segments return toward their original configuration. The shoulder portions 7 are then in contact with the face of the wall member remote from the direction of insertion and the first tubular member 3 forms a grommet-like structure in the aperture. The second tubular member is then screwed further into the first tubular member until the peripheral region 14 of the flange member 12 contacts the annular flange 5 forcing this into sealing engagement with the wall member 1. The action of the screw thread pulls the shoulder surfaces 7 firmly into contact with the wall member thus clamping the wall member between the shoulder surfaces 7 and the flange member 12 and annular flange 5, the relatively non-deformable portion 11 of the second tubular member retaining the deformable segments in position and preventing them from moving radially inward. The adhesive-coated annular flange 5 then effectively seals the device to the wall member. Finally, the supply line is inserted into the device and through the aperture, and the heat recoverable sleeve 15 is heated so as to seal the supply line firmly to the device.

Figure 3:
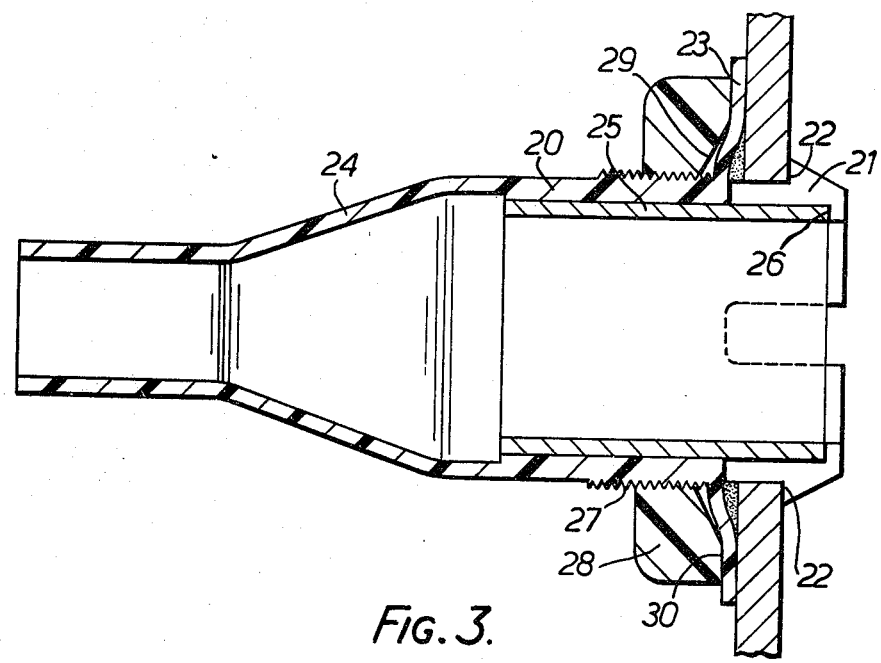
FIG. 3 illustrates a further form of feedthrough device according to the invention.
Figure 4:
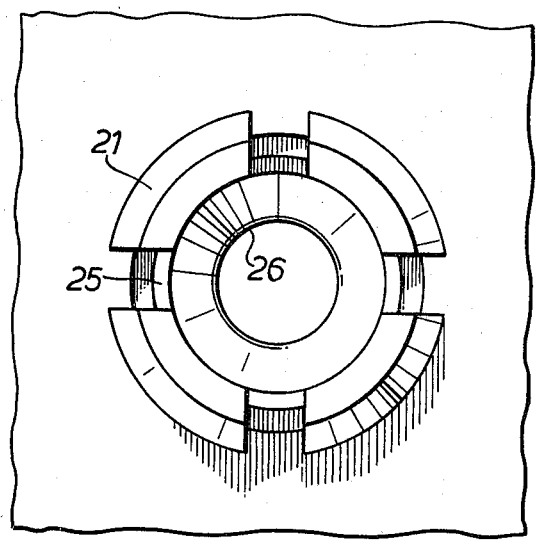
FIG. 4 illustrates the feedthrough device of FIG. 3 in end elevation.

Referring now to FIG. 3, an alternative form of feedthrough device according to the invention comprises a first tubular member 20 having integrally formed therewith radially inwardly deformable segments 21, having laterally extending shoulders 22, a resiliently deformable annular flange 23 and an integral sleeve 24 formed from a heat recoverable material. Within the first tubular member there is positioned a relatively non-deformable second tubular member 25 which rests against a locating lip 26 on the deformable segments 21. The first tubular member 20 is provided with an external threaded portion 27 which co-operates with an internal thread on an outwardly projecting flange member 28. The outwardly projecting flange member is provided with an undercut portion 29, leaving an annular peripheral region 30 in contact with the deformable annular flange 23.

The operation of the device is similar to that previously described in connection with FIGS. 1 and 2. The radially inwardly deformable segments 21 of the first tubular member 20 are pushed through the aperture until the segments are clear of the aperture, whence they spring back toward their original configuration so that the shoulders 22 engage the face of the wall member remote from the direction of insertion. The relatively non-deformable tubular member 25 is then inserted through the sleeve 23 which is in its expanded (heat recoverable) state and pushed forward until it contacts the locating lip 26 on the deformable segments 21 whereupon it effectively restrains the segments from inward deformation. The outwardly projecting flange member 28 is then screwed onto the first member 20, so that the annular peripheral region 30 of the flange member contacts the resilient annular flange 23 so that they come into sealing engagement with the wall member whilst, at the same time, pulling the shoulder surfaces 22 of the deformable segments 21 firmly into contact with the wall member, whereupon the shoulder surfaces 22 and the outwardly projecting flange member 28 exert an axial clamping action upon the annular flange 23 and the wall member and retain and seal the device to the wall member. Finally, the supply line is inserted through the device and the heat shrinkable sleeve is heated to form a pressure tight seal.

Figure 5:
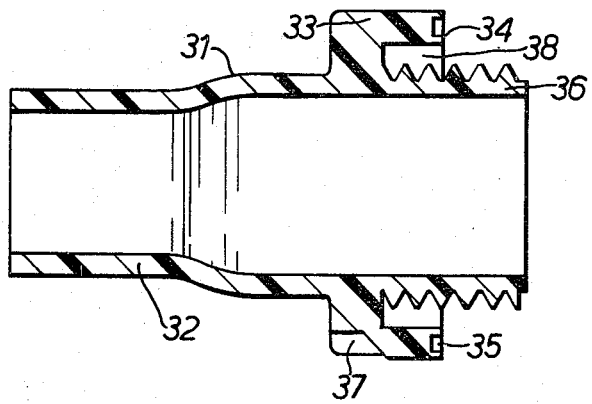
FIG. 5 represents a sectional side elevation of the second member of a third form of feedthrough device according to the invention.
Figure 6:
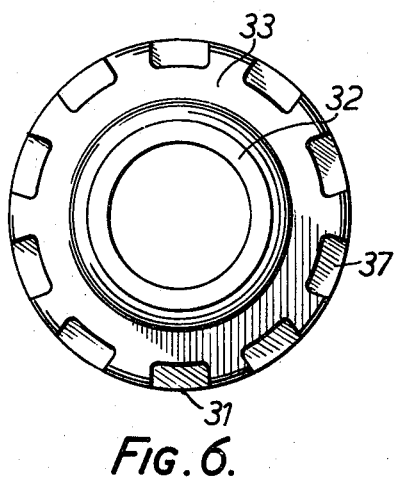
FIG. 6 illustrates the second member of FIG. 5 in end elevation.
Figure 7:
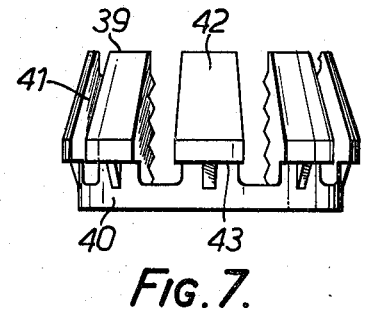
FIG. 7 illustrates a side elevation of the first member of a third form of feedthrough device according to the invention.

A third form of feedthrough device according to the present invention is shown in FIGS. 5 to 7.

The device comprises a second member indicated generally by the reference numeral 31 as shown in FIGS. 5 and 6. This has a heat-shrinkable tubular end portion 32 for sealing with a supply line and is provided with an outwardly projecting annular flange 33. The flange 33 has a sealing surface 34 which includes an annular peripheral groove for better sealing engagement with the wall as, in this embodiment, no resilient annular flange is provided. The member 31 also has a non-deformable portion 36 for insertion through the aperture, the portion 36 being externally screw-threaded. Recessed portions 37 are provided to provide a suitable grip for any screwing operation. Annular flange 33 is cut back to provide an annular recess 38 between itself and non-deformable portion 36.

The complementary first member which forms the rest of the device is shown in FIG. 7 and indicated generally by reference numeral 39. This comprises a short tubular body portion 40 provided with eight spaced apart radially deformable tines 41. The internal surfaces of both tubular body portion 40 and the tines 41 are internally screw-threaded for engagement with the non-deformable portion 36 of second member 31 and each tine 41 is provided with a tapered external surface 42 leading to a shoulder 43.

In use the non-deformable portion 40 of first member 39 is screwed onto second member 31 and the relatively loosely assembled composite device so formed is pushed through the aperture in the wall with the tapered surfaces 42 of tines 41 leading. The tines 41 are inwardly radially deformed but spring back when shoulders 43 have passed through the aperture. First member 39 is now screwed more firmly into second member 31 so that the non-deformable tubular portion 40 becomes located in annular recess 38. In so doing the tines are forced outwardly by the non-deformable portion 36 and the sealing surface 34 of the outwardly projecting annular flange 33 and the laterally extending shoulders 43 of the tines 41 together act to clamp the wall between them. The supply line may now be passed through the assembled and tightly positioned feedthrough device and the heat-shrinkable tubular end portion shrunk firmly to grip it.

It will be appreciated that the method of the present invention is not limited to any particular sequence of operation. In some cases, for example, it may be advantageous to heat the heat-shrinkable sleeve around the supply line before positioning the latter within the aperture.

What is claimed is:

1. A feedthrough device for sealing a supply line within an aperture in a wall member, which comprises
   (a) a first tubular member comprising a portion adapted to extend through the aperture, which portion is radially deformable to allow insertion of said portion through the aperture and is provided with a laterally extending shoulder surface adapted to abut one side of the wall to prevent withdrawal of said portion through the aperture, the first tubular member abutting only said one side of the wall;
   (b) a second tubular member having a relatively non-deformable portion adapted to engage with the first tubular member to restrain the laterally extending shoulder surface of the deformable portion against radially inward deformation;
   (c) an outwardly projecting flange member coaxially disposed in relation to the first tubular member and axially movable with respect thereto to co-operate with the laterally extending shoulder surface to exert an axial clamping action therebetween thereby effecting a seal at the wall member adjacent said flange member, and
   (d) a recoverable sleeve adapted, on recovery, to effect a seal between the device and the supply line.

2. A feedthrough device as claimed in claim 1, wherein the first member comprises a plurality of spaced apart radially deformable tines.

3. A feedthrough device as claimed in claim 2, wherein the shoulder surface is formed at the base of said tines.

4. A feedthrough device as claimed in claim 2, wherein the external surface of each tine slopes outwardly towards its base.

5. A feedthrough device as claimed in claim 2, wherein there are from 4 to 12 tines.

6. A feedthrough device as claimed in claim 2, wherein there are from 6 to 10 tines.

7. A feedthrough device as claimed in claim 2, wherein there are 8 tines.

8. A feedthrough device as claimed in claim 1, wherein the internal surface of the first member and the external surface of the second member are screw threaded.

9. A feedthrough device as claimed in claim 1, wherein the outwardly projecting flange member is formed integrally with the second tubular member.

10. A feedthrough device as claimed in claim 1, wherein the outwardly projecting flange member is provided with an undercut portion.

11. A feedthrough device as claimed in claim 1, wherein one of said members is additionally provided with a resilient annular flange adapted to be urged into engagement with the wall member by the outwardly projecting flange member.

12. A feedthrough device as claimed in claim 11, wherein the resilient annular flange is coated with an adhesive on its surface adapted to contact the wall member.

13. A feedthrough device as claimed in claim 11 wherein the resilient annular flange is resiliently deformable.

14. A feedthrough device as claimed in claim 1, wherein a peripheral sealing ring is provided between the outwardly projecting flange and the wall member.

15. A feedthrough device as claimed in claim 1, wherein the recoverable sleeve is formed integrally with the second tubular member.

16. A feedthrough device as claimed in claim 1, wherein the recoverable sleeve is a heat-shrinkable sleeve.

17. A feedthrough device as claimed in claim 1, wherein the outwardly projecting flange member is provided with a sealing surface having an annular groove therein.

18. A feedthrough device for sealing a supply line within an aperture in a wall member which comprises:

(a) an internally screw threaded first tubular member comprising a portion adapted to extend through said aperture, said portion being radially deformable and comprising a plurality of spaced apart tines, the external surface of each of which slopes outwardly toward its base where a laterally extending shoulder is formed, said shoulders adapted to abut one side of the wall to prevent withdrawal of said portion through the aperture, the first tubular member abutting only said one side of the wall;

(b) a second tubular member having an externally screw-threaded non-deformable portion adapted to engage said first tubular member to restrain said tines against inward deformation and having an outwardly projecting member coaxially disposed in relation to the first tubular member and axially movable with respect thereto to co-operate with said laterally extending shoulders to exert an axial clamping action on the faces of the wall member; and (c) a recoverable sleeve member adapted, on recovery, to provide a seal about the supply line.

19. A feedthrough device as claimed in claim 18, wherein the recoverable sleeve is formed integrally with the second tubular member.

20. A feedthrough device as claimed in claim 18, wherein said outwardly projecting flange member is provided with a sealing surface having an annular groove therein.

* * * * *